(12) United States Patent
Nakamura et al.

(10) Patent No.: US 7,773,399 B2
(45) Date of Patent: Aug. 10, 2010

(54) CONTROL APPARATUS FOR INHIBITING SYNCHRONOUS-RECTIFIER SWITCHING ELEMENTS AT LOW OUTPUT CURRENT IN A VOLTAGE TRANSFORMING APPARATUS

(75) Inventors: Kimikazu Nakamura, Handa (JP); Tsuyoshi Yamashita, Anjo (JP); Yuji Hayashi, Kasugai (JP)

(73) Assignees: DENSO Corporation, Kariya (JP); Nippon Soken, Inc., Nishio (JP)

( * ) Notice: Subject to any disclaimer, the term of this patent is extended or adjusted under 35 U.S.C. 154(b) by 512 days.

(21) Appl. No.: 11/699,075

(22) Filed: Jan. 29, 2007

(65) Prior Publication Data

US 2007/0177409 A1    Aug. 2, 2007

(30) Foreign Application Priority Data

Jan. 27, 2006 (JP) .............................. 2006-019745

(51) Int. Cl.
*H02M 3/335* (2006.01)
(52) U.S. Cl. .................. 363/127; 363/21.06; 363/21.14
(58) Field of Classification Search .................. 363/127, 363/21.06, 21.14, 79–81, 17, 98, 132
See application file for complete search history.

(56) References Cited

U.S. PATENT DOCUMENTS 6,618,274 B2 * 9/2003 Boylan et al. ................. 363/17
7,224,590 B2 * 5/2007 Lin ........................ 363/21.06

FOREIGN PATENT DOCUMENTS

| JP | 06-343262 | 12/1994 |
|----|-----------|---------|
| JP | 07-007928 | 1/1995 |
| WO | 2006 101188 | 9/2006 |

OTHER PUBLICATIONS

Office Action mailed Feb. 11, 2009 in co-pending U.S. Appl. No. 11/699,076.

* cited by examiner

*Primary Examiner*—Harry Behm
(74) *Attorney, Agent, or Firm*—Nixon & Vanderhye P.C.

(57) ABSTRACT

The control apparatus for controlling a voltage transforming apparatus having a transformer, power switching elements disposed in a primary side, and synchronous-rectifying switching elements disposed in a secondary side includes a judging circuit making a judgment as to whether or not an output current of the voltage transforming apparatus is smaller than a specified current on the basis of a primary-side current of the transformer and an inhibition circuit inhibiting the synchronous-rectifying switching elements from performing their synchronous-rectifying control operation when the judging circuit judges that the output current is smaller than the specified current. The judging circuit makes the judgment on the basis of the primary-side current flowing through the primary coil of the transformer immediately before the power switching elements are turned off.

10 Claims, 9 Drawing Sheets

CONTROL APPARATUS FOR INHIBITING SYNCHRONOUS-RECTIFIER SWITCHING ELEMENTS AT LOW OUTPUT CURRENT IN A VOLTAGE TRANSFORMING APPARATUS

CROSS-REFERENCE TO RELATED APPLICATION

This application is related to Japanese Patent Application No. 2006-19745 filed on Jan. 27, 2006, the contents of which are hereby incorporated by reference.

BACKGROUND OF THE INVENTION

1. Field of the Invention

The present invention relates to a control apparatus for a voltage transforming apparatus having a transformer and configured to rectify an AC voltage being transformed by the transformer by use of synchronous-rectifying switching elements which are provided in the secondary side of the transformer and are turned on and off in synchronization with power switching elements provided in the primary side of the transformer, and to smooth the rectified DC voltage.

2. Description of Related Art

It is known to provide a voltage transforming apparatus having a transformer with synchronous-rectifying switching elements instead of a diode serving as a rectifying means in the secondary side of the transformer. Since the on-resistance of the synchronous-rectifying switching elements is smaller than that of the diode, replacing the diode with the synchronous-rectifying switching elements makes it possible to reduce power loss of the voltage transforming apparatus.

However, it should be noted that the voltage transforming apparatus provided with the synchronous-rectifying switching elements cannot always perform their synchronous-rectifying control operation, because when the output current of the voltage transforming apparatus is small, there is a fear that the output current flows back through the synchronous-rectifying switching elements, which lowers the performance and reliability of the synchronous-rectifying switching elements.

Accordingly, it has been proposed to monitor the output current of the voltage transforming apparatus on the basis of a voltage drop across a current-detecting resistor provided in the secondary side of the transformer, and to inhibit the synchronous-rectifying control operation if the voltage drop indicates that the back flow of the output current can occur.

Incidentally, in recent years, some hybrid vehicles are provided with such a voltage transforming apparatus for the purpose of stepping down a DC output voltage of a high-voltage source accumulating electric power generated by a vehicle generator, and charging a low-voltage battery by this stepped-down DC voltage. In this case, since a large output current flows in the secondary side of the transformer, the current-detecting resistor produces a large amount of heat. This can cause the voltage transforming apparatus to become large in size. In addition, in this case, the current-detecting resistor is required to have a highly accurate resistance value.

It might occur that a hall type current sensor is used instead of the current-detecting resistor. However, using the hall type current sensor increases the production cost of the voltage transforming apparatus, because the hall type current sensor is expensive.

For such reasons, it has been attempted to estimate the output current flowing in the secondary side of the transformer on the basis of a current flowing in the primary side of the transformer. However, the current flowing in the primary side of the transformer is a continual current flowing in synchronization with the conduction states of the power switching elements provided in the primary side of the transformer, and in addition, it contains switching noise caused by the on/off operation of these power switching elements. Accordingly, it has been very difficult to make a correct judgment as to whether the synchronous-rectifying control operation should be performed or stopped on the basis of the detected value of the current flowing in the primary side of the transformer.

SUMMARY OF THE INVENTION

The present invention provides a control apparatus for controlling a voltage transforming apparatus including a transformer, power switching elements provided in a primary side of the transformer and performing on-operation and off-operation to invert a DC input voltage to an AC voltage, synchronous-rectifying switching elements provided in a secondary side of the transformer and performing synchronous-rectifying control operation in synchronization with the power switching elements in order to rectify the AC voltage transformed by the transformer into a DC output voltage, and a smoothing circuit smoothing the DC output voltage, the control apparatus comprising:

a judging circuit making a judgment as to whether or not an output current of the voltage transforming apparatus is smaller than a specified current on the basis of a primary-side current flowing through a primary coil of the transformer immediately before the off-operation; and an inhibition circuit inhibiting the synchronous-rectifying switching elements from performing the synchronous-rectifying control operation when the judging circuit judges that the output current is smaller than the specified current.

In the control apparatus of the present invention, since a judgment as to whether or not the output current of the voltage transforming apparatus is smaller than a specified current is made on the basis of the primary-side current flowing through the primary coil of the transformer of the voltage transforming apparatus immediately before the off-operation, that is immediately before the power switching elements are turned off, it becomes possible to suppress the effect of the surge noise caused by the off-operation on the detected value of the primary-side current, to thereby more appropriately perform the switching between permission and inhibition of the synchronous-rectifying control operation.

The control apparatus may further comprise an error signal generating circuit generating an error signal indicative of a difference between a detection value of the DC output voltage and a reference voltage, a PWM modulating circuit generating a PWM signal having a duty ratio depending on the error signal, and a driver circuit generating, through power conversion of the PWM signal, drive signals to be applied to the power switching elements. In this case, the judging circuit may make the judgment at a timing in synchronization with the PWM signal appearing upstream of the driver circuit. Alternatively, the judging circuit may make the judgment at a timing in synchronization with the drive signals being outputted from the driver circuit.

The judging circuit may make the judgment, while compensating for at least one of effect of variation of the duty ratio of the power switching elements, effect of variation of the DC output voltage, and effect of variation of the DC input voltage in a relationship between the primary-side current and the output current of the voltage transforming apparatus.

Other advantages and features of the invention will become apparent from the following description including the drawings and claims.

PREFERRED EMBODIMENTS OF THE INVENTION

First Embodiment

Figure 1:
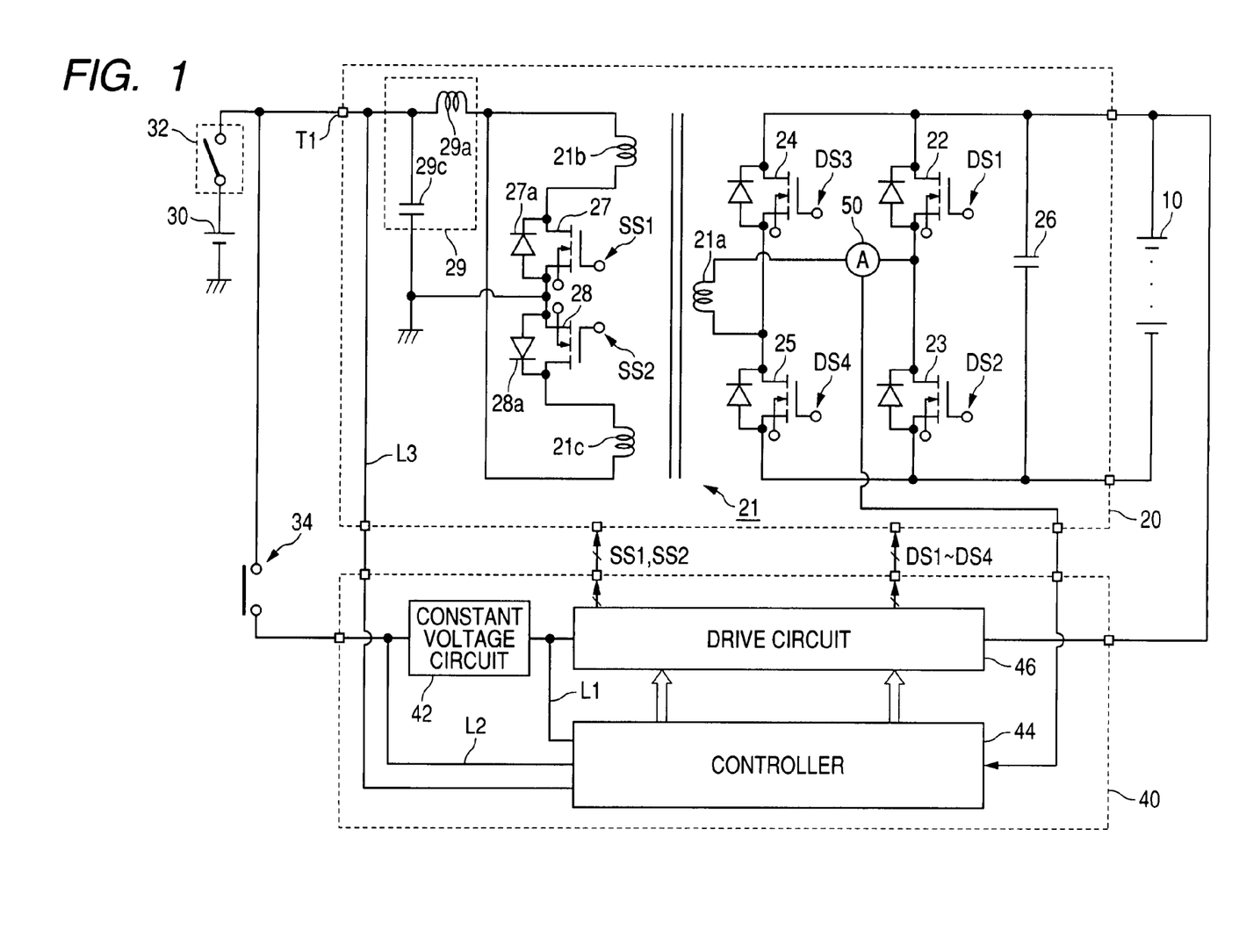
FIG. 1 is a diagram showing a structure of a DC-DC converter as a voltage transforming apparatus, and a structure of a control apparatus according to a first embodiment of the invention used for controlling the DC-DC converter.

FIG. 1 is a diagram showing a structure of a DC-DC converter 20 as a voltage transforming apparatus, and a structure of a control apparatus 40 according to a first embodiment of the invention, which is for controlling the DC-DC converter 20.

The DC-DC converter 20 is for stepping down a DC output voltage of a high-voltage battery 10 on a hybrid vehicle, and charging a low-voltage battery 30 by the stepped down DC voltage. The DC-DC converter 20 has a transformer 21 stepping down the output voltage of the high-voltage battery 10 depending on a turn number ratio between a primary coil 21a and secondary coils 21b, 21c of the transformer 21.

A primary-side circuit of the DC-DC converter 20 includes a series of power switching elements 22, 23 a series of power switching elements 24, 25, and a capacitor 26 which are connected to the high-voltage battery 10 in parallel. The primary coil 21a is connected to a connection node of the power switching elements 22, 23 at one end thereof and to a connection node of the power switching elements 24, 25 at the other end thereof.

On the other hand, a secondary-side circuit of the DC-DC converter 20 includes a series of synchronous-rectifying switching elements 27, 28 and a smoothing circuit 29 constituted by an inductor 29a and a capacitor 29c. The series of the synchronous-rectifying switching elements 27, 28 is connected between the secondary coils 21b, 21c. Each of the synchronous-rectifying switching elements 27, 28 is provided with a diode connected thereacross. A connection node of the synchronous-rectifying switching elements 27, 28 is grounded. One terminals of the synchronous-rectifying switching elements 27, 28 which are not grounded are connected to one end of the inductor 29a of the smoothing circuit 29. The other end of the inductor 29 is connected to one terminal of the capacitor 29 which is grounded at the other terminal thereof.

The control apparatus 40 supplies the power switching elements 22 to 25 with drive signals DS1 to DS4, respectively, so that the power switching elements 22-25 operate to keep the output voltage of the DC-DC converter 20 at a desired value. At this time, the control apparatus 40 also supplies the synchronous-rectifying switching elements 27, 28 with drive signals SS1, SS2, respectively, so that the synchronous-rectifying switching elements 27, 28 operate in synchronization with the power switching elements 22 to 25 in order to rectify a current flowing through the secondary coil 21b or 21c.

The control apparatus 40, which includes a controller 44 and a drive circuit 46, is supplied with electric power from the low-voltage battery 30 when an ignition switch 32 is turned on to close a contact of a control relay 34. The control apparatus 40 further includes a constant voltage circuit 42 which receives the voltage of the low-voltage battery 30, and generates a constant voltage to be supplied to the driver circuit 46. The constant voltage is also supplied to the controller 44 through a power supply line L1.

The controller 44 has a function of monitoring the state of the control relay 34 through a monitoring line L2 connected between the controller 44 and an input terminal of the constant voltage circuit 42 connected to the control relay 34. The controller 44 has also a function of monitoring the output voltage of the DC-DC converter 20 through a monitoring line L3 connected between an output terminal T1 of the DC-DC converter 20 and the controller 44. The drive circuit 46 generates the drive signals DS1 to DS4 in accordance with the monitored output voltage of the DC-DC converter 20. The drive signals DS1 to DS4 are signals for adjusting duty ratio (on-time period) of the power switching elements 22 to 25 depending on the difference between the output voltage of the DC-DC converter 20 and a predetermined voltage. The controller 44 also generates the drive signals SS1, SS2 in accordance with a value of a current flowing through the primary coil 21a which is detected by a current sensor 50 connected between the connection node of the power switching elements 22, 23 and the primary coil 21a.

Next, the control operation of the synchronous-rectifying switching elements 27, 28 is explained.

Figure 2:
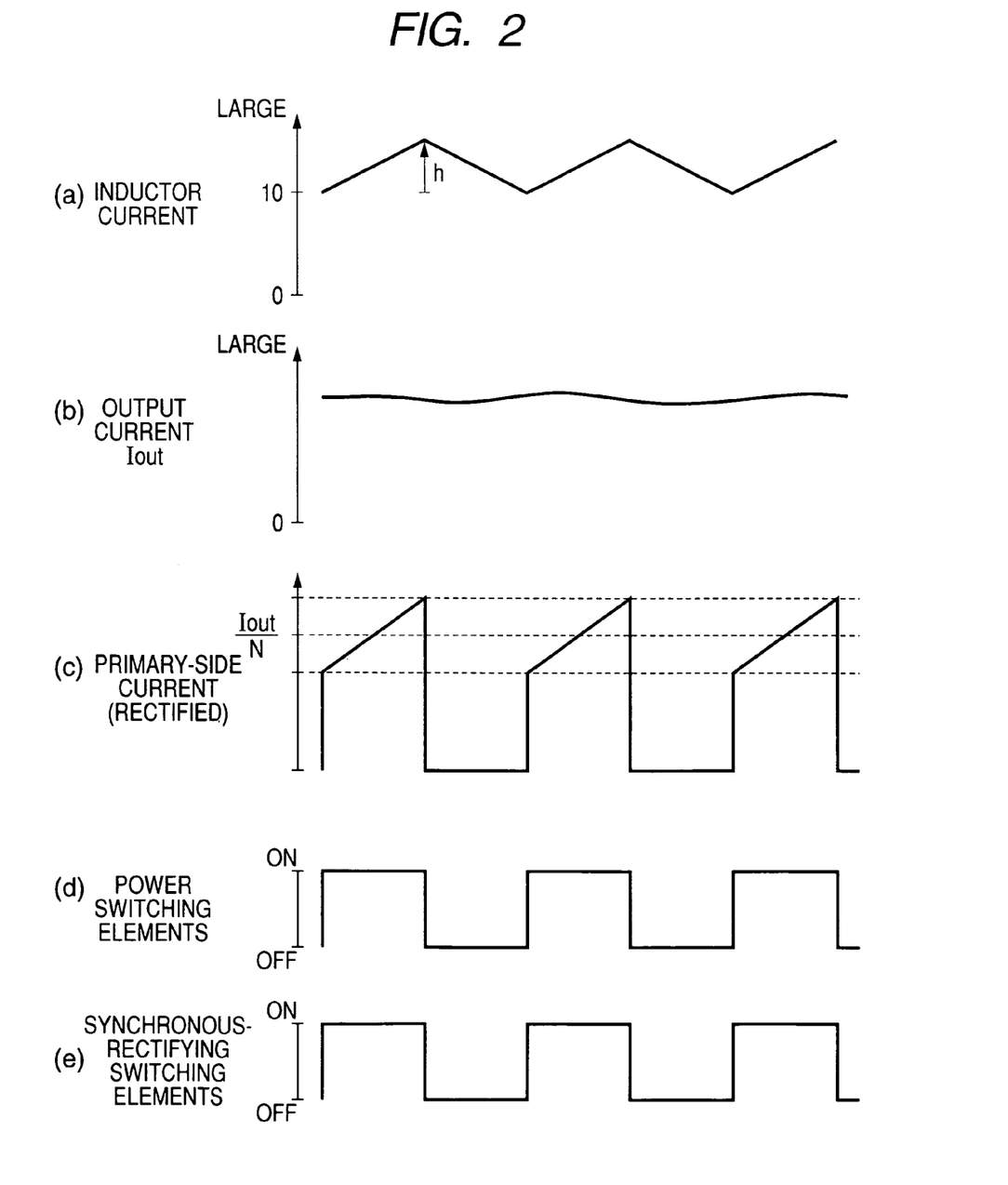
FIG. 2 is a diagram showing temporal changes of various signals in the DC-DC converter.

FIG. 2 shows temporal changes of an inductor current, or a current flowing through the inductor 29a ((a) in FIG. 2), the output current Iout of the DC-DC converter 20 ((b) in FIG. 2), a primary-side current, or a current flowing through the primary coil 21a after having been rectified ((c) in FIG. 2), a conduction state of one of the pair of the power switching elements 22, 25 and the pair of the power switching elements 24, 23 ((d) in FIG. 2), and a conduction state of one of the synchronous-rectifying switching elements 27, 28 ((e) in FIG. 2).

As shown in these figures, when one of the pair of the power switching elements 22, 25 and the pair of the power switching elements 24, 23 is turned on, and a corresponding one of the synchronous-rectifying switching elements 27, 28 is turned on synchronously, the inductor current increases gradually. On the other hand, when the one of the pairs is turned off, and the corresponding one of the synchronous-rectifying switching elements 27, 28 is turned off synchronously, the inductor current decreases gradually. When the synchronous-rectifying switching element 27 or 28 is turned off, the diode 27a or 28a connected across the synchronous-rectifying switching element 27 or 28 allows a surge current to pass therethrough. Since the inductor current, which repeats the cycle of gradual increase and gradual decrease, is smoothed by the capacitor 29c, the output current Iout of the DC-DC converter 20 becomes substantially a constant current as shown in (b) in FIG. 2.

On the other hand, the primary-side current (the current flowing through the primary coil 21a) is a continual current which sharply rises to a certain value and then increases gradually when one of the pair of the power switching elements 22, 25 and one of the pair of the power switching elements 24, 23 are turned on (may be referred to simply as "on-operation" hereinafter), and sharply falls to zero when the ones of the pairs are turned off (may be referred to simply as "off-operation" hereinafter) as shown in (c) in FIG. 2. Also, as shown in (c) in FIG. 2, an intermediate value between the values of the primary-side current immediately after the on-operation and immediately before the off-operation is approximately equal to the output current Iout divided by the turn number ratio N of the transformer 21, that is, approximately equal to Iout/N. The reason is that the value of the rectified primary-side current is equal to a sum of the value Iout/N, a value of an AC component of the inductor current divided by the turn number ratio N, and a value of an excitation current of the transformer 21. Here, when the turn number of the primary coil 21a is Np, and the turn number of the secondary coil 21b, 21c is Ns, the turn number ratio N is equal to Np/Ns.

It should be noted that the synchronous-rectifying switching elements 27, 27 cannot always perform the synchronous-rectifying control operation. The reason is that, since the backflow of the inductor current can deteriorate the synchronous-rectifying switching elements 27, 28, the synchronous-rectifying switching elements 27, 28 have to be inhibited from turning on during a period immediately before the on-operation. In this embodiment, the secondary-side current or the inductor current is estimated from the value of the rectified primary-side current, and the switching between permission and inhibition of the synchronous-rectifying control operation is performed on the basis of the estimated secondary-side current.

Here, points to note when detecting the primary-side current are set forth below.

Figure 3A:
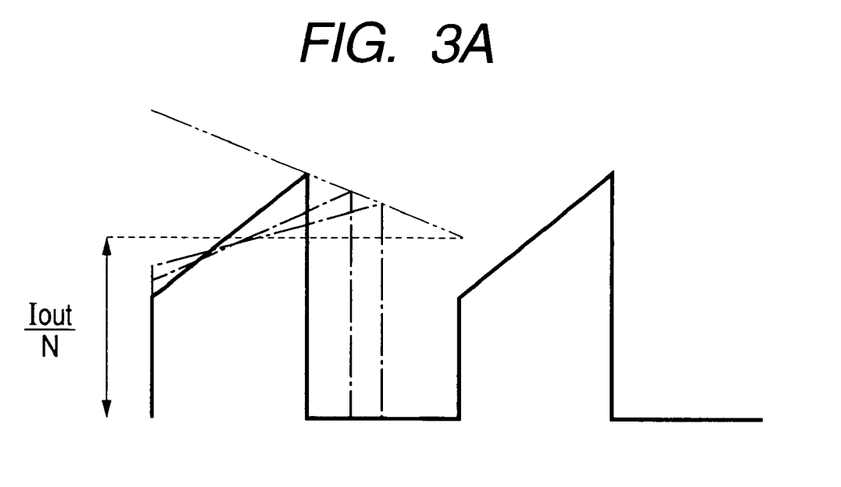
FIG. 3A is a diagram showing how a rectified primary-side current of the DC-DC converter varies depending on a duty ratio of switching elements included in the DC-DC converter.

FIG. 3A shows how the rectified primary-side current varies depending on the duty ratio of the power switching elements 22 to 25 when the output current Iout is kept constant. As shown in this figure, the peak value of the primary-side current reduces with the increase of the duty ratio. In addition, the rising edge value of the rectified primary-side current also varies depending on the duty ratio. Accordingly, it is difficult to detect the value IO of the inductor current at the moment when it changes from the gradually decreasing state to the gradually increasing state on the basis of the value of the rectified primary-side current. The value IO at this moment may be referred to as "switch-point current value" hereinafter.

Figure 3B:
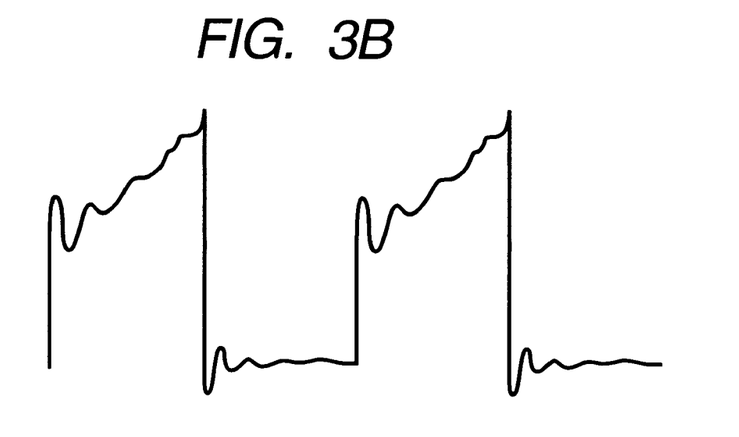
FIG. 3B is a diagram explaining a switching noise contained in the rectified primary-side current of the DC-DC converter.

Moreover, as shown in FIG. 3B, the primary-side current contains switching noise (surge noise) which takes its maximum immediately after the turn off, and decreases gradually thereafter.

Hence, it is preferable to detect the primary-side current immediately before the turn off from the view point of minimizing the effect of the surge noise. In addition, to accurately estimate the secondary-side current from the primary-side current, it is preferable to compensate for the effect of the duty ratio on a relationship between the primary-side current and the output current.

In this embodiment, it is noted that the primary-side current after the on-operation reduces linearly with the increase of the duty ratio as indicated by the chain double-dashed line in FIG. 3A. The value of the rectified primary-side current superimposed by a sawtooth wave signal indicated by the shaded area shown in FIG. 4 becomes constant during a period after the turn on and before the turn off when the output current Iout is kept constant.

Figure 4:
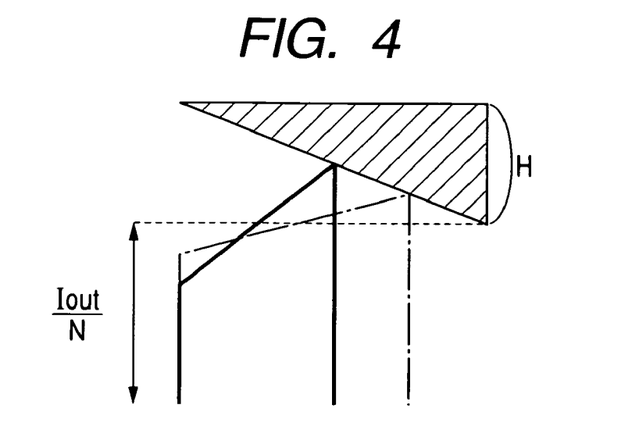
FIG. 4 is a diagram showing a sawtooth wave signal superimposed onto the rectified primary-side current.

Next, detailed explanation is made as to the waveform of the sawtooth wave signal.

The value IL of the inductor current when the synchronous-rectifying switching element 27 or 28 is turned on is given by the following equation (c1).

$$IL=(Vin/N-Vout)t/L+IO \quad (c1)$$

A variation amount h of the inductor current, that is a difference between the value of the inductor current immediately after the on-operation and that immediately before the off-operation, can be obtained by substituting an on-time ton to the time t in the equation (c1). When the duty ratio and switching frequency of the power switching elements 22 to 25 is D and f, respectively, the on-time ton is equal to D/f. Accordingly, the variation value h is given by the following equation (c2).

$$h=(Vin/N-Vout)D/fL \quad (c2).$$

The value Ic of the primary-side current having been rectified is given by the following equation (c3).

$$Ic=Iout/N-(Vin/N-Vout)D/2fLN+(Vin/N-Vout)t/NL \quad (c3)$$

The equation (c3) requires a condition that the rectified primary-side current is equal to a sum of the output current Iout divided by the turn number ratio N and the AC component of the inductor current divided by the turn number ratio N. Since the inductance of the transformer 21 is far larger than the inductance L of the inductor 29a, the effect of the magnetizing current of the transformer 21 is negligible compared to the effect of the AC component of the inductor 29a. Accordingly in this embodiment, the AC component of the magnetizing current of the transformer 21 is neglected.

The second term of the right-hand side of the equation (c3) determines the upslope value of the rectified primary-side current (the value of the rectified primary-side current immediately after the on-operation). The third term of the right-hand side of the equation (c3) determines variation of the current after the on-operation.

The peak value of the rectified primary-side current immediately before the off-operation can be calculated by substituting the on-time ton into the time t in the equation (c3). Since ton=D/f, the peak value Ip of the rectified primary-side current immediately before the off-operation is given by the following equation (c4).

$$Ip=Iout/N+(Vin/N-Vout)D/2fLN \quad (c4)$$

Under steady state condition, since the relationship of D=NVout/Vin holds among the input voltage Vin, the output voltage Vout, and the duty ratio D, the second term of the right-hand side of the equation (c4) is given by the following equation (c5).

The second term of the right-hand side of the equation (c4)

$$= (Vin/N - Vout)D/2fLN = (1 - D)Vout/2fLN \qquad (c5)$$

By substituting zero to D in the second term of the right-hand side of the equation (c4), the height H of the sawtooth wave signal shown in FIG. 4 is given by the following equation (c6).

$$H = Vout/2fLN \qquad (c6)$$

Thus, the sawtooth wave signal is obtained as F(t) shown in the following equation (c7), which is a function of the time t.

$$F(t) = (Vout/2LN) \times t \qquad (c7)$$

Figure 5:
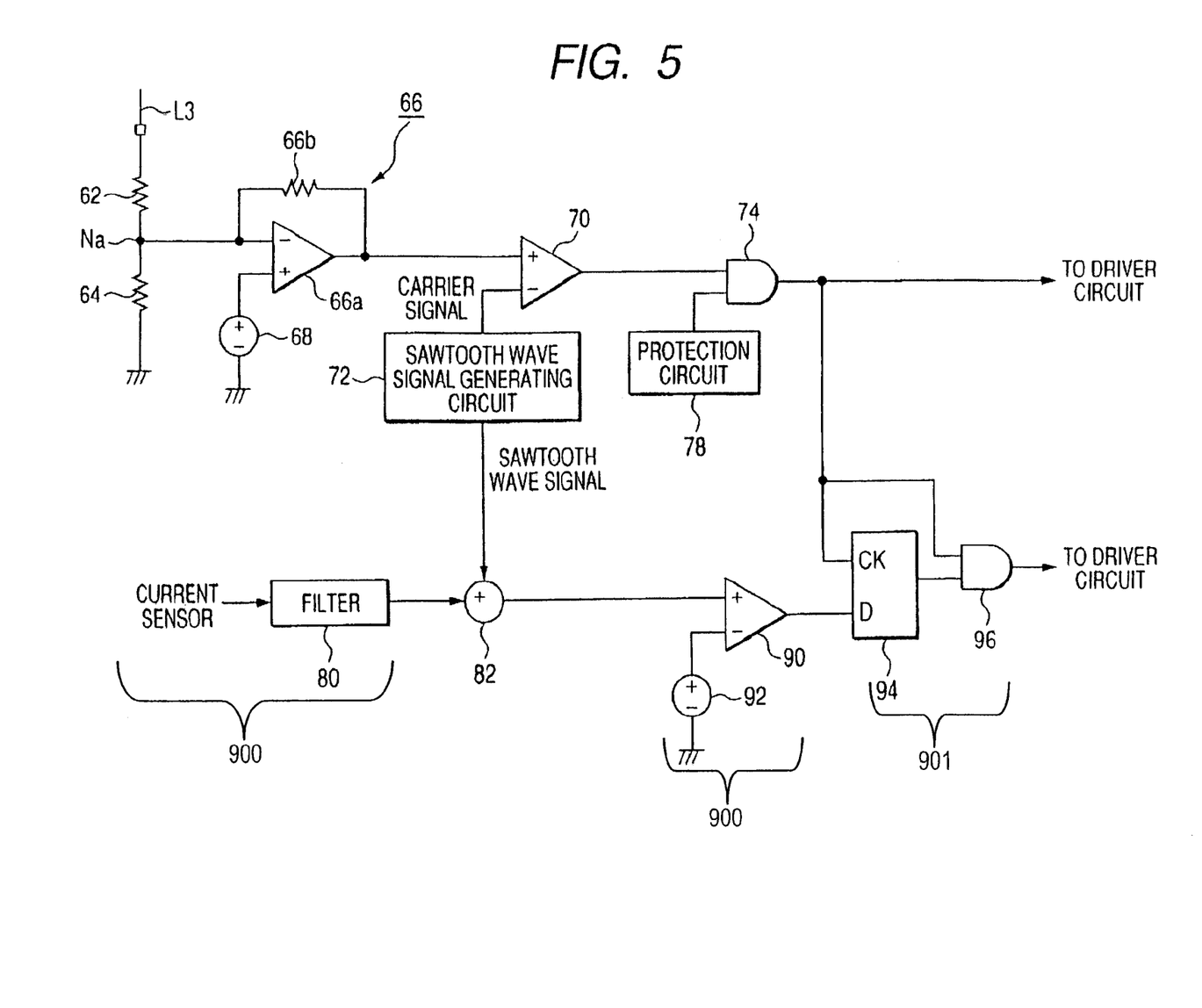
FIG. 5 is a diagram showing a structure of a part of a controller included in the control apparatus according to the first embodiment of the invention, which is dedicated to generation of drive signals applied to the switching elements included in the DC-DC converter.

FIG. 5 shows a structure of a part of the controller 44 dedicated to generation of the drive signals DS1 to DS4 applied to the power switching elements 22 to 25, and the drive signals SS1, SS2 applied to the synchronous-rectifying switching elements 27, 28.

As shown in this figure, a series of resistors 62, 64 is connected between the monitoring line L3 and the ground. A voltage at a connection node Na of the resistors 62, 64 is supplied to an error amplifier 66 as a detected value of the output voltage of the DC-DC converter 20. The error amplifier circuit 66 includes an operational amplifier 66a having an inverting input terminal connected to the connection node Na, a non-inverting input terminal grounded through a reference voltage source 68, and on output terminal connected to the inverting input terminal through a resistor 66b.

The output of the error amplifier circuit 66 is applied to a non-inverting input terminal of a PWM comparator 70. The PWM comparator 70 receives a carrier signal which is a voltage signal having a sawtooth waveform generated by a sawtooth wave signal generating circuit 72 at its inverting input terminal.

The output signal of the PWM comparator 70, which is used as a base to generate the drive signals DS1 to Ds4, has a pulse width depending on a difference between a reference voltage generated by the reference voltage source 68 and the voltage at the connection node Na. The output signal of the PWM comparator 70 is applied to one input terminal of an AND circuit 74 the other input terminal of which is applied with an output of a protection circuit 78. The output of the AND circuit 74 becomes H level when both the output of the PWM comparator 70 and the output of the protection circuit 78 are at H level.

The protection circuit 78 is configured to set its output to L level when a specific condition to inhibit the power switching elements 22 to 25 from operating holds. Such a condition may hold when the temperature of the DC-DC converter 20 rises excessively.

The detected value from the current sensor 50 is supplied to an adder 82 through a filter 80. The adder 82 adds the sawtooth wave signal generated by the sawtooth wave signal generating circuit 72 to the output of the filter 80, and applies summation of these signals to an non-inverting input terminal of an inhibition processing comparator 90 whose inverting input terminal is applied with a threshold voltage generated by a reference voltage source 92. This threshold voltage is set at such a value that the primary-side current does not flow backward.

The output of the inhibition processing comparator 90 is latched by a flip-flop 94 in synchronization with a falling edge of the output of the AND circuit 74. An AND circuit 96 produces a logical product of the output of the AND circuit 74 and the output of the inhibition processing comparator 90 latched by the flip-flop 94, and supplies it to the drive circuit 46 as a base to generate the drive signals applied to the synchronous-rectifying switching elements 27, 28.

The current sensor 50, the filter 80, the inhibition processing comparator 90, and the reference voltage source 92 constitute a judging circuit 900 making a judgment as to whether or not the output current of the DC-DC converter 20 is smaller than a specified current on the basis of the primary-side current flowing through the primary coil of the transformer 21. The flip-flop 94 and the AND circuit 96 constitute an inhibition circuit inhibiting the synchronous-rectifying switching elements from performing the synchronous-rectifying control operation when the judging circuit judges that the output current is smaller than the specified current.

Figure 6:
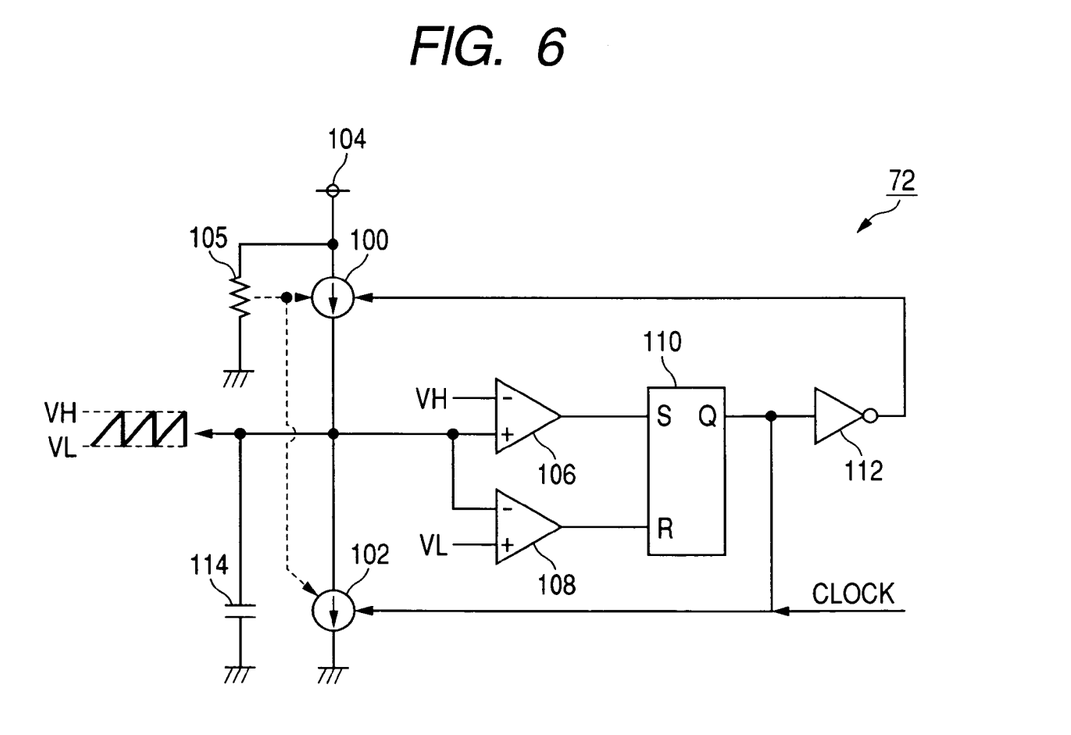
FIG. 6 is a diagram showing a structure of a sawtooth wave signal generating circuit included in the controller of the first embodiment of the invention.

FIG. 6 shows a part of a structure of the sawtooth wave signal generating circuit 72, which is dedicated to the production of a base signal used as a base to produce the sawtooth wave signal or the carrier.

The sawtooth wave signal generating circuit 72 includes a current source 100 determining a rising rate of the base signal, and a current source 102 determining a falling rate of the base signal, which are series-connected between a voltage source 104 and the ground. Each of the current sources 100, 102 has an output characteristic which varies depending on a current flowing through a resistor 105 connected between the voltage source 104 and the ground. A connection node of the current sources 100, 102 is connected to a non-inverting input terminal of a comparator 106 and to an inverting input terminal of a comparator 108. An inverting input terminal of the comparator 106 is applied with a higher limit value VH of the base signal, while a non-inverting input terminal of the comparator 108 is applied with a lower limit value VL of the base signal.

The output of the comparator 106 is applied to a set terminal of an RS flip-flop 110, while the output of the comparator 108 is applied to a reset terminal of the RS flip-flop 110. The current source 102 is activated when the output of the RS flip-flop 110 is at H level. The current source 100 is activated when the output of the RS flip-flop 110 is at L level, and accordingly a H-level signal is applied to the current source 100 through an inverter 112. The output terminal of the RS flip-flop 110 is applied with a reference clock CLOCK serving as a reference of fall of the base signal.

A capacitor 114 is connected between the connection node of the current sources 100, 102, and the ground. A terminal voltage of the capacitor 114 makes the base signal. The shape of a waveform of the base signal can be adjusted by adjusting the higher limit value VH, lower limit value VL, capacitance of the capacitor 114, and resistance of the resistor 105.

In this embodiment, the sawtooth wave signal expressed by the equation (c7) is produced by adjusting the capacitance of the capacitor 114 and the resistance of the resistor 105.

Figure 7:
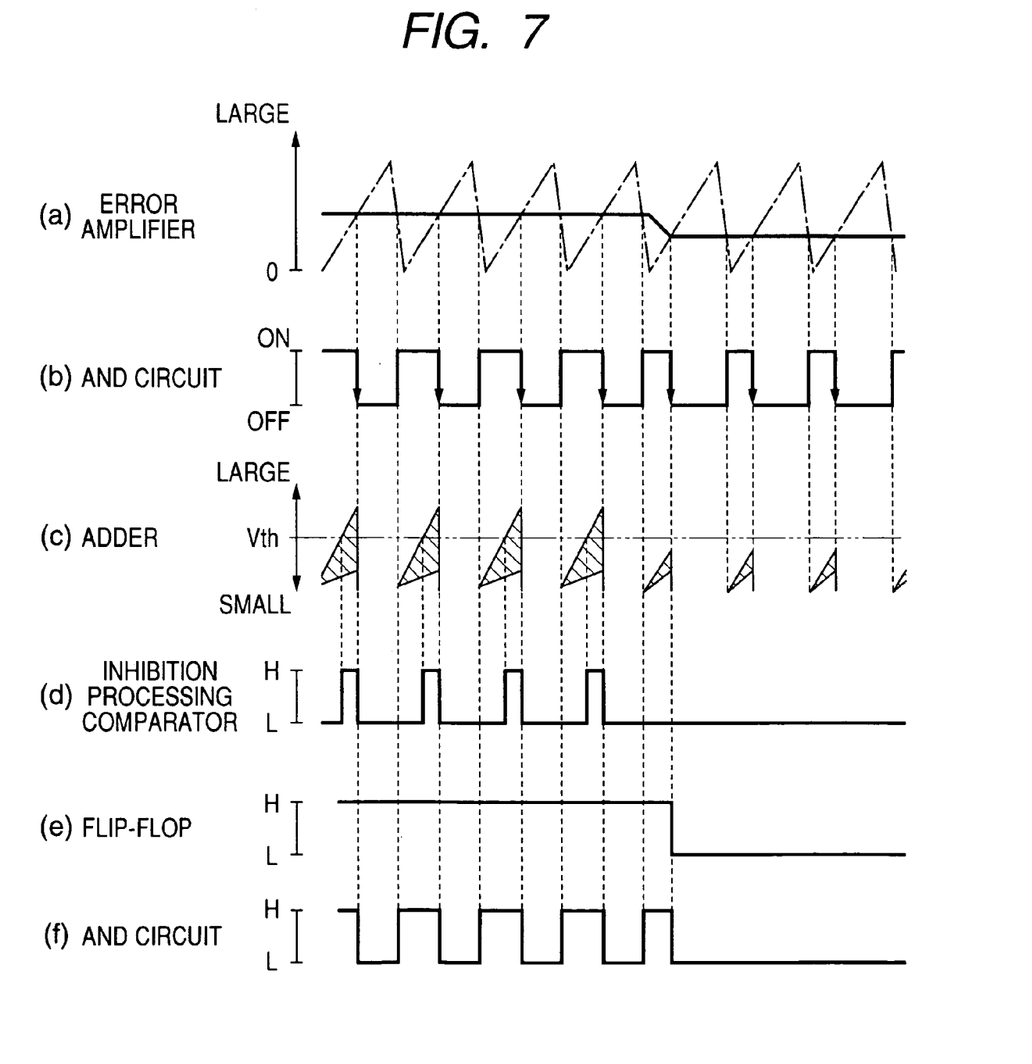
FIG. 7 is a diagram for explaining in which timing switching between permission and inhibition of a synchronous-rectifying control by the DC-DC converter is performed.
Figure 8:
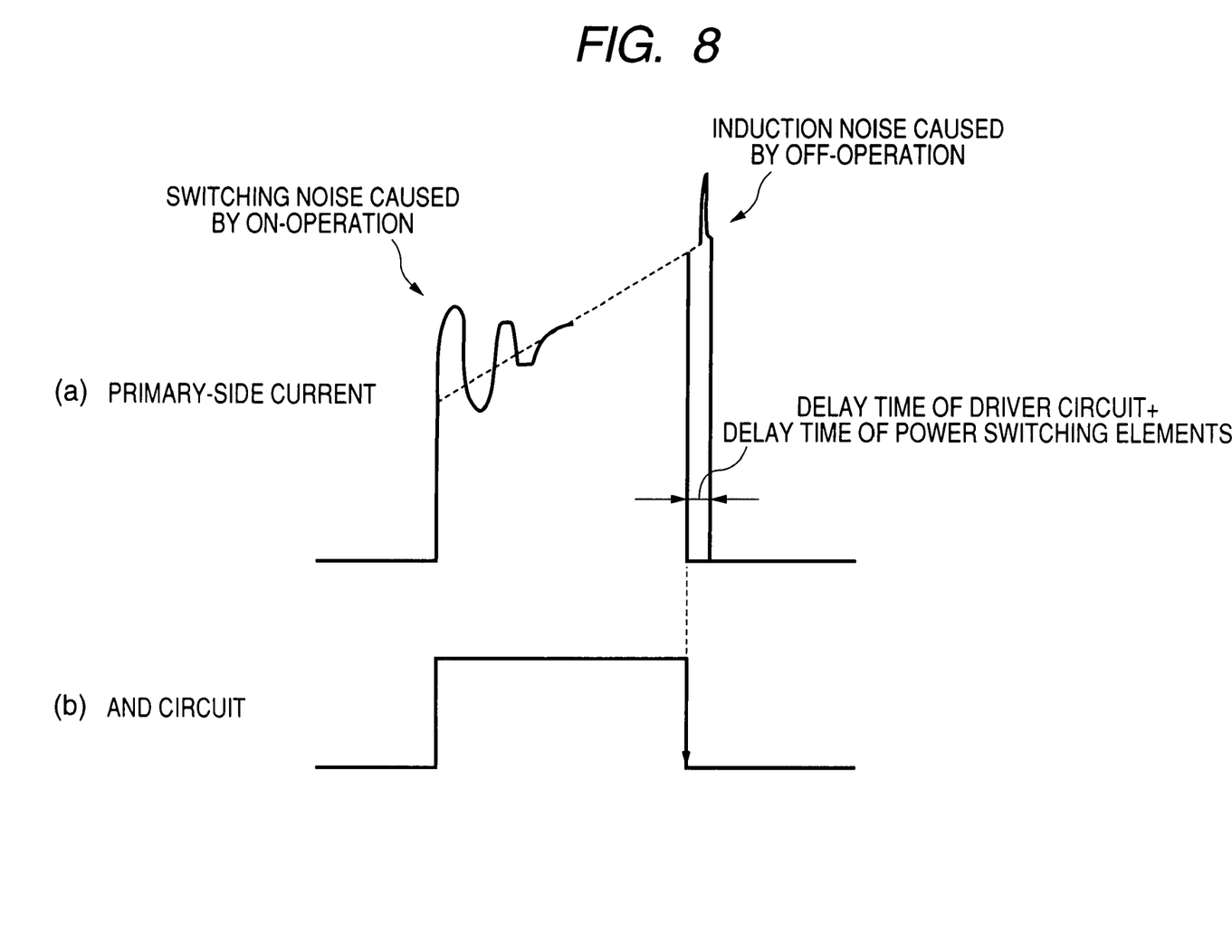
FIG. 8 is a diagram explaining a timing to sample a detection value of a primary side current of the DC-DC converter in the first embodiment.

Next, it is explained how the switching between permission and inhibition of the synchronous-rectifying control operation is performed with reference to FIG. 7. FIG. 7 shows temporal variations of the output of the error amplifier circuit 66 (solid line in (a) in FIG. 7), the output of the carrier signal (chain line in (a) in FIG. 7), the output of the AND circuit 74 ((b) in FIG. 7), the output of the adder 82 (to be more correct, the primary-side current indicted by solid lines in (c) in FIG. 7, and the sawtooth wave signal superimposed onto the primary-side current, which is indicated by shaded areas in (c) in FIG. 7), the output of the inhibition processing comparator 90

((d) in FIG. 7), the output of the flip-flop 94 ((e) in FIG. 7), and the output of the AND circuit 96 ((f) in FIG. 7).

As seen from these figures, when the output of the adder 82 exceeds the threshold voltage Vth of the reference voltage source 92 indicated by the chain double-dashed line in (c) in FIG. 7, the output of the inhibition processing comparator 90 becomes H level. On the other hand, when the output of the adder 82 falls below the threshold voltage Vth before the off-operation, since the output of the inhibition processing comparator 90 changes to L level, the output of the flip-flop 94 turns to L level in synchronization with the fall edge of the output of the AND circuit 74. At this time, the output of the AND circuit 96 becomes L level, as a result of which the synchronous-rectifying switching elements 27, 28 are inhibited from being turned on.

As explained above, in this embodiment, the switching between permission and inhibition of the synchronous-rectifying control operation is performed on the basis of the comparison result between the output of the adder 82 and the threshold voltage Vth, so that the effect of the switching noise on the detection value from the current sensor 50 is effectively suppressed. This makes it possible to appropriately perform the switching between permission and inhibition of the synchronous-rectifying control operation, while reducing the lowering of sensitivity of the current sensor 50 due to the provision of the filter 80. It should be noted that since the timing when the output of the AND circuit 74 falls is used as a timing to make a judgment as to whether or not the switching between permission and inhibition of the synchronous-rectifying control operation should be performed, it becomes possible to use the value of the primary-side current detected a certain time ahead of the off-operation of to determine whether or not the switching between permission and inhibition of the synchronous-rectifying control operation should be performed. Here, this certain time is a sum of a delay time from a moment when the output of the AND circuit 74 is received by the driver circuit 46 to a moment when the power switching elements 22 to 25 are respectively applied with corresponding drive signals, and a delay time from the moment when the power switching elements 22 to 25 are respectively applied with these corresponding drive signals to a moment when the power switching elements 22 to 25 are actually turned off.

The first embodiment described above offers the following advantages.

(1) The switching between permission and inhibition of the synchronous-rectifying control operation is performed on the basis of the output of the inhibition processing comparator 90 immediately before the power switching elements 22 to 25 are turned off. This makes it possible to suppress the effect of the surge noise on the detected value of the primary-side current, to thereby more appropriately perform the switching between permission and inhibition of the synchronous-rectifying control operation.

(2) The timing when the output of the AND circuit 74 falls is used as a timing to make a judgment as to whether or not the switching between permission and inhibition of the synchronous-rectifying control operation should be performed. This makes it possible to make a judgment as to whether or not the switching should be performed at a timing ahead of the timing when the power switching elements 22 to 25 are actually turned off by a time equal to the sum of the delay time by the driver circuit 46 and delay time by the power switching elements 22 to 25.

(3) The detected value from the current sensor 50 inputted to the inhibition processing comparator 90 is corrected by the sawtooth wave signal. This makes it possible to keep substantially constant the relative magnitude relationship between the two signals inputted to the inhibition processing comparator 90 immediately before the off-operation, as long as the output current Iout is kept constant.

(4) The carrier signal inputted to the PWM comparator 70 and the sawtooth wave signal inputted to the adder 82 are produced by the same circuit. This makes it possible for the sawtooth wave signal to be well synchronized with the operations of the power switching elements 22 to 25.

Second Embodiment

A control apparatus according to a second embodiment of the invention is explained below. The below explanation focuses on a difference between the first embodiment and the second embodiment.

Figure 9:
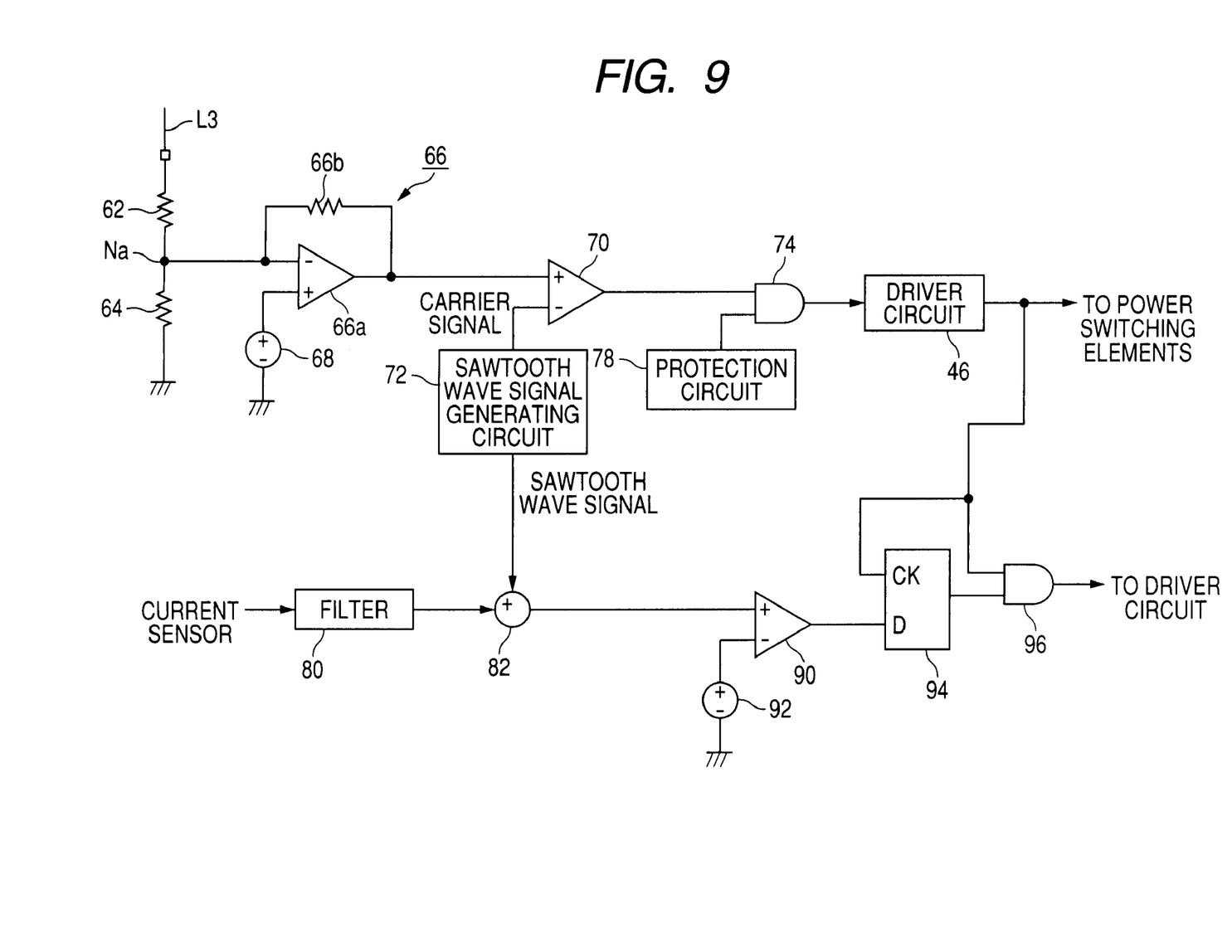
FIG. 9 is a diagram showing a structure of a part of a controller included in a control apparatus according to a second embodiment of the invention, which is dedicated to generation of drive signals applied to switching elements included in the DC-DC converter.
Figure 10:
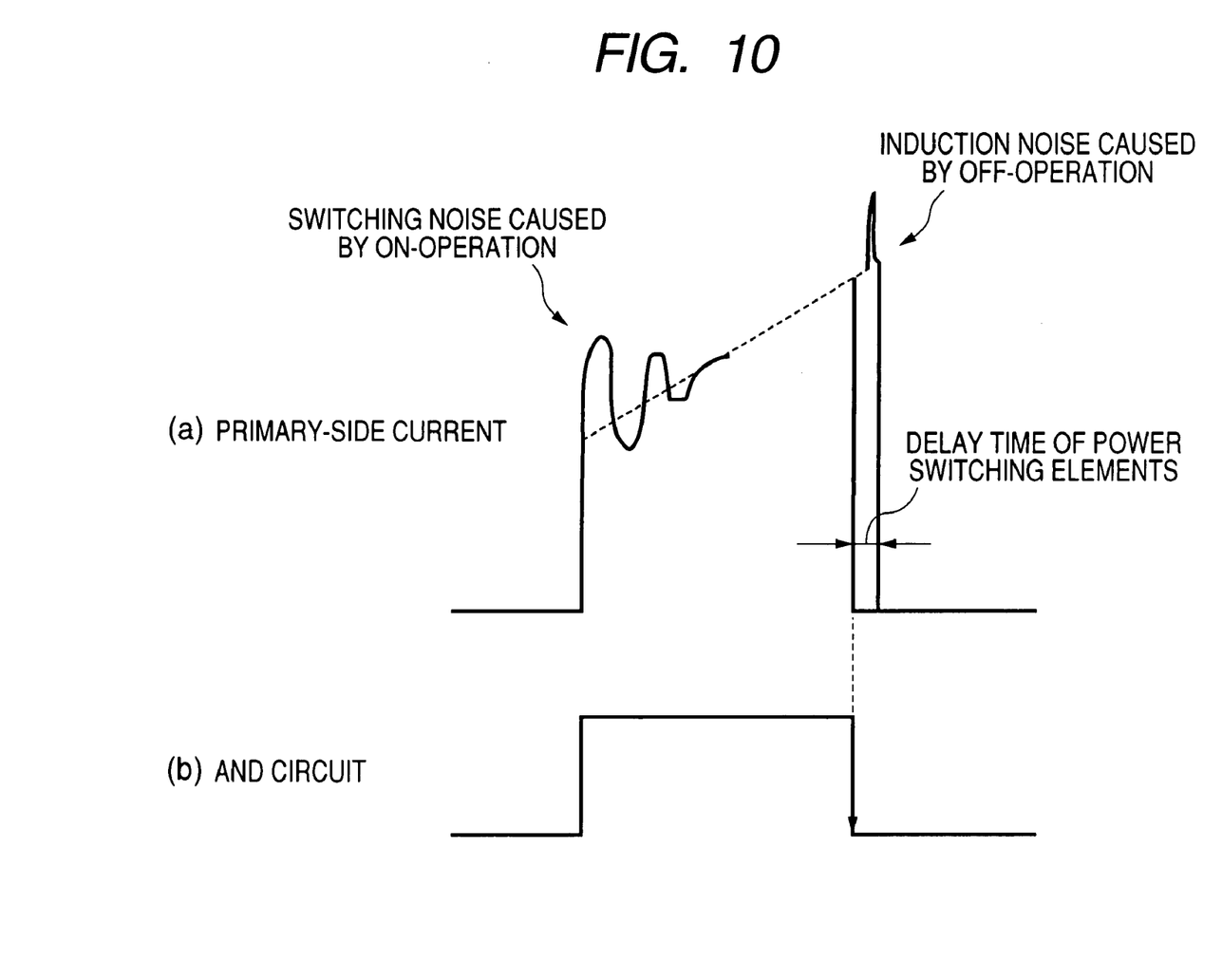
FIG. 10 is a diagram explaining a timing to sample a detection value of a primary side current of the DC-DC converter in the second embodiment.

FIG. 9 shows a structure of a part of the control apparatus 40 of this second embodiment, which is dedicated to the switching between permission and inhibition of the synchronous-rectifying control operation. In FIG. 9, the reference numerals identical to those in FIG. 5 represent the same elements.

As shown in this figure, in this embodiment, the flip-flop 94 receives the output of the driver circuit 46 (to be more accurate, a signal produced by subjecting the output of the driver circuit 46 to power conversion). This makes it possible to use the value of the primary-side current detected a certain time ahead of the off-operation to make a judgment as to whether or not the switching between the permission and inhibition of the synchronous-rectifying control operation should be performed. Here, this certain time is a delay time elapsing from a moment when the power switching elements 22 to 25 are respectively applied with the drive signals to a moment when the power switching elements 22 to 25 are actually turned off.

The second embodiment offers the following advantage in addition to the advantages (1), (3), (4) offered by the first embodiment.

(5) The timing when the output of the driver circuit 46 falls is used as a timing to make a judgment as to whether or not the switching between permission and inhibition of the synchronous-rectifying control operation should performed. This makes it possible to make a judgment as to whether or not the switching should be performed at a timing ahead of the timing when the power switching elements 22 to 25 are actually turned off by the delay time of the power switching elements 22 to 25.

Other Embodiments

The timing to judge whether or not the switching between permission and inhibition of the synchronous-rectifying control operation should be performed is not limited to those used in the above described embodiments. For example, it may be a timing when the signal appearing between the PWM comparator 70 and the AND circuit 74 falls.

In the above described embodiments, although the controller 44 is constituted by hardware logics, it may be constituted by a CPU and a program describing the processing operation of the PWM comparator 70, the sawtooth wave signal generating circuit 72, and the inhibition processing comparator 90. In this case, the sawtooth wave signal may be generated by a counter configured to be incremented at a constant rate, and reset in a certain cycle. The timing to sample the detection value from the current sensor 50 to be used for making a judgment as to whether or not the switching between permission and inhibition of the synchronous-rectifying control operation should be performed may be a moment when a count value of a timer configured to start in synchronization with the on-operation reaches a predetermined value set depending on the duty ratio of the power switching elements.

The means for judging whether or not the switching between permission and inhibition of the synchronous-rectifying control operation should be performed is not limited to those shown in the above described embodiments. For example, the threshold voltage of the reference voltage source 92 subtracted by the voltage value of the sawtooth wave signal outputted from the sawtooth wave signal generating circuit 72 may be applied to the inverting input terminal of the inhibition processing comparator 90. Also, one of the two signals inputted to the inhibition processing comparator 90 may be corrected in accordance with the output voltage. The reason is that the detection value from the current sensor 50 superimposed by the sawtooth wave signal becomes constant before the off-operation irrespective of the variation of the output current Iout only if the output voltage is kept constant.

The threshold voltage may be provided with a large margin in order that the switching between permission and inhibition of the synchronous-rectifying control operation can be performed on the basis of the result of a direct comparison between the threshold voltage and the detection value from the current sensor 50. However, in this case, the frequency of unnecessary inhibition of synchronous-rectification may increase. It should be noted that compensating for at least one of the effect of the duty ratio of the power switching elements 22 to 25, the effect of the output voltage Vout, and the effect of the input voltage Vin on the relationship between the primary-side current and the output current, when making a judgment as to whether or not the output current is smaller than the specified current as in the above described embodiments, makes it possible to more properly perform the switching between permission and inhibition of the synchronous-rectifying control operation.

In the above described embodiments, although the smoothing inductor is provided in the secondary side of the transformer 21, it may be provided in the primary side of the transformer 21.

It should be noted that the present invention is applicable not only to a hybrid vehicle by to an electric vehicle as well.

The above explained preferred embodiments are exemplary of the invention of the present application which is described solely by the claims appended below. It should be understood that modifications of the preferred embodiments may be made as would occur to one of skill in the art.

What is claimed is:

1. A control apparatus for controlling a voltage transforming apparatus including a transformer, power switching elements provided in a primary side of said transformer and performing on-operation and off-operation to invert a DC input voltage to an AC voltage, a synchronous-rectifying switching elements provided in a secondary side of said transformer and performing synchronous-rectifying control operation in synchronization with said power switching elements in order to rectify said AC voltage transformed by said transformer into a DC output voltage, and a smoothing circuit smoothing said DC output voltage, said control apparatus comprising:

a driver circuit outputting first and second drive signals to said power switching elements, said power switching elements performing said on-operation while receiving said first drive signal, and performing said off-operation while receiving said second drive signal;

a judging circuit making a judgment as to whether or not an output current of said voltage transforming apparatus is smaller than a specified current on the basis of a primary-side current flowing through a primary coil of said transformer before said second drive signal is outputted from said driver circuit in order to prevent said judging circuit from making said judgment on the basis of said primary-side current while said driver circuit outputs said second drive signal; and an inhibition circuit inhibiting said synchronous-rectifying switching elements from performing said synchronous-rectifying control operation when said judging circuit judges that said output current is smaller than said specified current.

2. The control apparatus according to claim 1, further comprising an error signal generating circuit generating an error signal indicative of a difference between a detection value of said DC output voltage and a reference voltage, and a PWM modulating circuit generating a PWM signal having a duty ratio depending on said error signal, and wherein the driver circuit generates, through power conversion of said PWM signal, said drive signals to said power switching elements and said judging circuit makes said judgment at a timing in synchronization with said PWM signal appearing upstream of said driver circuit.

3. The control apparatus according to claim 2, wherein said judging circuit makes said judgment, while compensating for at least one of effect of variation of said duty ratio of said power switching elements, effect of variation of said DC output voltage, and effect of variation of said DC input voltage on a relationship between said primary-side current and said output current of said voltage transforming apparatus.

4. The control apparatus according to claim 1, further comprising an error signal generating circuit generating an error signal indicative of a difference between a detection value of said DC output voltage and a reference voltage, a PWM modulating circuit generating a PWM signal having a duty ratio depending on said error signal, and wherein the driver circuit generates, through power conversion of said PWM signal, said drive signals to said power switching elements, and said judging circuit makes said judgment at a timing in synchronization with said drive signals being outputted from said driver circuit.

5. The control apparatus according to claim 3, wherein said judging circuit makes said judgment, while compensating for at least one of effect of variation of said duty ratio of said power switching elements, effect of variation of said DC output voltage, and effect of variation of said DC input voltage on a relationship between said primary-side current and said output current of said voltage transforming apparatus.

6. A method of controlling a voltage transforming apparatus including a transformer, power switching elements provided in a primary side of said transformer and performing on-operation and off-operation to invert a DC input voltage to an AC voltage, a synchronous-rectifying switching elements provided in a secondary side of said transformer and performing synchronous-rectifying control operation in synchronization with said power switching elements in order to rectify said AC voltage transformed by said transformer into a DC output voltage, and a smoothing circuit smoothing said DC output voltage, said method comprising:

outputting, from a driver circuit, first and second drive signals to said power switching elements, said power switching elements performing said on-operation while receiving said first drive signal, and performing said off-operation while receiving said second drive signal;

making a judgment as to whether or not an output current of said voltage transforming apparatus is smaller than a specified current on the basis of a primary-side current flowing through a primary coil of said transformer before said second drive signal is outputted from said driver circuit in order to prevent said judging circuit from making said judgment on the basis of said primary-side current while said driver circuit outputs said second drive signal; and inhibiting said synchronous-rectifying switching elements from performing said synchronous-rectifying control operation when said judgment is that said output current is smaller than said specified current.

7. The method according to claim 6, further comprising generating an error signal indicative of a difference between a detection value of said DC output voltage and a reference voltage, generating a PWM signal having a duty ratio depending on said error signal, and generating, through power conversion of said PWM signal, said drive signals to said power switching elements, said judgment being made at a timing in synchronization with said PWM signal appearing upstream of a position where the drive signals are generated.

8. The method according to claim 6, further comprising generating an error signal indicative of a difference between a detection value of said DC output voltage and a reference voltage, generating a PWM signal having a duty ratio depending on said error signal, and generating, through power conversion of said PWM signal, said drive signals to said power switching elements, said judgment being made at a timing in synchronization with said drive signals being output.

9. The method according to claim 7, wherein said judgment is made while compensating for at least one of effect of variation of said duty ratio of said power switching elements, effect of variation of said DC output voltage, and effect of variation of said DC input voltage on a relationship between said primary-side current and said output current of said voltage transforming apparatus.

10. The method according to claim 8, wherein said judgment is made while compensating for at least one of effect of variation of said duty ratio of said power switching elements, effect of variation of said DC output voltage, and effect of variation of said DC input voltage on a relationship between said primary-side current and said output current of said voltage transforming apparatus.

* * * * *